Patented Oct. 28, 1924.

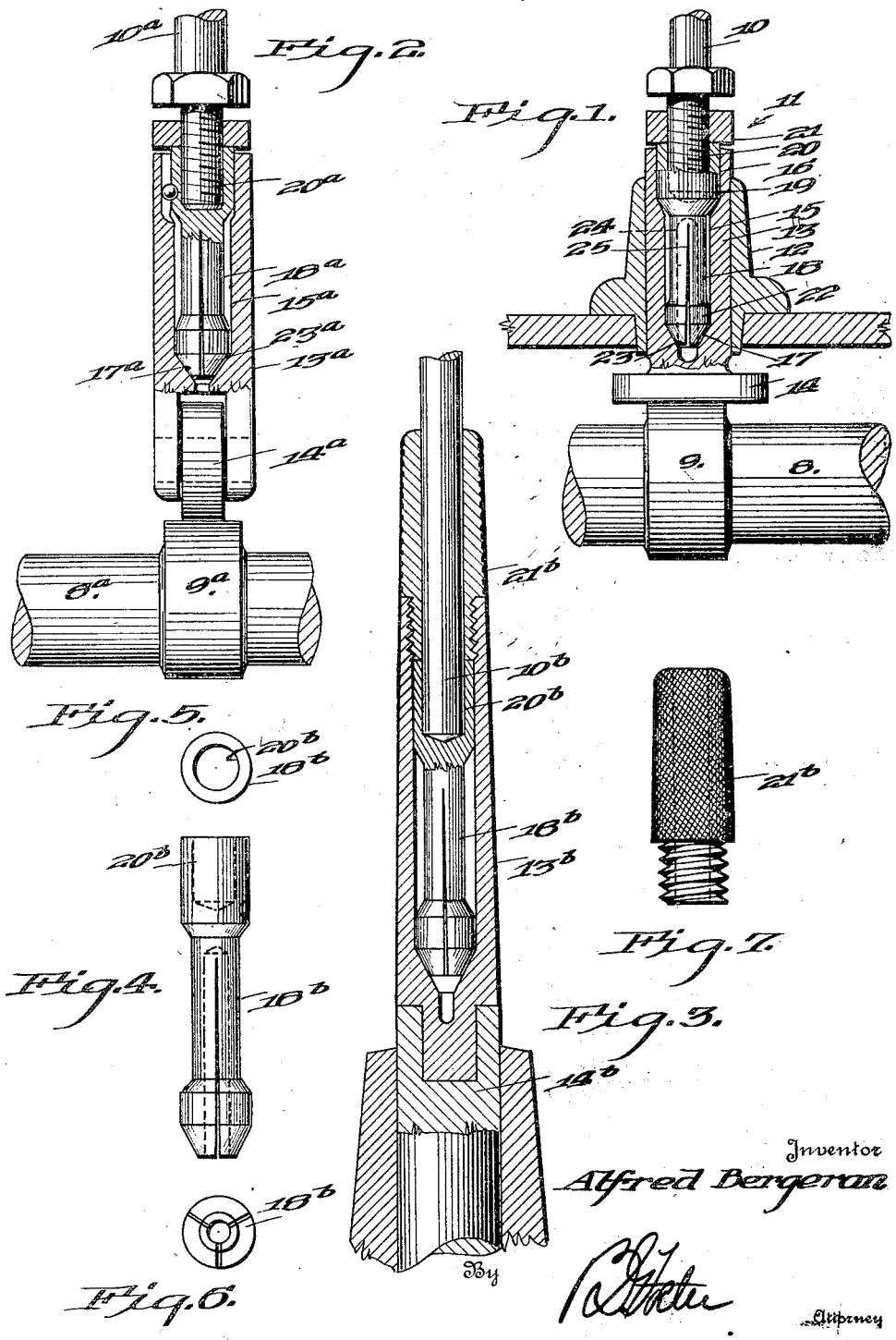

1,512,901

UNITED STATES PATENT OFFICE.

ALFRED BERGERON, OF WOONSOCKET, RHODE ISLAND.

VALVE-OPERATING MECHANISM.

Application filed March 22, 1922. Serial No. 545,742.

*To all whom it may concern:*

Be it known that I, ALFRED BERGERON, a citizen of the United States, residing at Woonsocket, in the county of Providence and State of Rhode Island, have invented certain new and useful Improvements in Valve-Operating Mechanism, of which the following is a specification.

The present invention relates to means for transmitting motion from the cam to the valve of an internal combustion engine or the like. As is well known, a certain amount of clearance is given between the motion-transmitting parts to allow for expansion and contraction, and as a consequence there is more or less noise created, due to the tapping of the parts when they come into contact.

The object of the present invention is to provide a novel structure in which the parts are all maintained in contact and the necessary lost motion is provided for in a manner that will eliminate noise.

Three embodiments of the invention are illustrated in the accompanying drawings, wherein:—

Figure 1 is a view partly in elevation and partly in section of one form of construction, Figure 2 is a similar view of a modified form of construction, Figure 3 is still another embodiment of the invention, Figure 4 is a view in elevation of the stem element shown in Figure 3, Figure 5 is a top plan view of the same, Figure 6 is a bottom plan view, Figure 7 is a view of the retaining plug and rod guide.

In the embodiment illustrated in Figure 1, a portion of the usual engine cam shaft is shown at 8, and is provided with a cam 9. A portion of a valve actuating rod is illustrated at 10. Interposed between the cam 9 and rod 10 is a motion-transmitting member designated generally by the reference numeral 11, and slidably mounted in a bushing 12. The member 11 consists of a socket element 13 having a foot 14 that rests upon the cam 9. The socket, designated 15, is longitudinally disposed in the element 13 and opens through the top of the same where it is enlarged, as illustrated at 16. The bottom of said socket is tapered to provide a correspondingly shaped bearing surface 17. In this socket is slidably mounted a stem member 18 having an upper enlarged portion 19 located in the enlarged portion 16 of the socket and provided with an adjusting screw 20 on which the valve actuating rod 10 rests. The screw 20 is threaded in the stem element and is held against accidental movement by a jamb nut 21. The lower portion of the stem element is provided with a head 22 terminating in a truncated cone portion 23 that slidably operates against the tapered surface 17. The stem element furthermore is longitudinally bored from its lower end, as illustrated at 24, and is longitudinally split, as shown at 25, the split tapering from the lower to the upper end, and forming resilient sections that will move towards each other, the number of the slits being varied as desired.

With this construction, it is to be understood that all the parts are in engagement, that is to say, the cam 9 is in bearing engagement with the foot 14; the surfaces 17 and 23 are in contact, and the rod 10 rests against the head of the adjusting screw 20. With this construction therefore the parts will always move simultaneously, and if there is any necessary compensation between them, it will be taken up by the stem element 18 sliding within the socket element 13. This sliding movement causes the lower end of the stem to be laterally compressed by reason of the bearing 17—23. The yielding action will, of course, spread the parts in case there is any contraction on the part of the valve actuating rod 10.

In Figure 2 the structure is shown in connection with a slightly different type of valve operating mechanism. The cam shaft is designated $8^a$ and the cam thereon $9^a$. The valve actuating rod is shown at $10^a$. In this device the socket element, designated $13^a$, carries a roller $14^a$ that operates on the cam $9^a$. The stem element $18^a$ is provided with a split and tapered lower end $23^a$ bearing against a tapered surface $17^a$, formed at the bottom of the socket $15^a$. An adjusting screw $20^a$, threaded into the upper end of the stem element, constitutes a bearing for the rod $10^a$.

In Figure 3 a tappet element is illustrated at $14^b$, and carries a socket element $13^b$ in which is placed the compressible stem element $18^b$. The upper end of the stem element in this structure is provided with a recessed seat $20^b$ to receive the lower end of the valve actuating rod $10^b$, and this rod is guided by a sleeve 21ᵇ threaded into the upper end of the socket element 13ᵇ and constituting a retainer for the stem element 18ᵇ.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:

1. In valve operating mechanism, the combination with a member to be operated and a member for operating it, of a yielding motion transmitting member interposed between the two members and including an element having a socket provided with a tapered bearing portion and guiding side walls, and a stem having a compressible tapered portion that has a bearing against the tapered bearing portion of the socket and an incompressible portion bearing against the guiding side walls.

2. In valve operating mechanism, the combination with a member to be operated and a member for operating it, of a yielding motion transmitting member interposed between the two members and including an element having a socket provided with a tapered bottom and guiding side walls at its outer end, and a stem having a compressible split end portion provided with a tapered head that slidably engages the tapered bottom of the socket, said stem having an outer enlarged portion that has a slidable bearing against the said guiding side walls of the socket.

In testimony whereof, I affix my signature.

ALFRED BERGERON.